United States Patent

[11] 3,550,902

| [72] | Inventors | Edgar J. Pidgeon<br>Santa Ana, Calif.;<br>Guillermo J. Vanegas, Louisville, Ky. |
|---|---|---|
| [21] | Appl. No. | 776,135 |
| [22] | Filed | Nov. 15, 1968 |
| [45] | Patented | Dec. 29, 1970 |
| [73] | Assignee | Cabot Corporation<br>Boston, Mass.<br>a corporation of Delaware |

[54] DOUBLE-UNION BALL VALVE ASSEMBLY
2 Claims, 4 Drawing Figs.

| [52] | U.S. Cl. ................................................. | 251/151,<br>251/315, 251/368 |
|---|---|---|
| [51] | Int. Cl. .................................................... | F16k 5/06 |
| [50] | Field of Search .......................................... | 251/159,<br>160, 164, 170, 171, 192, 151, 315, 368 |

[56] References Cited
UNITED STATES PATENTS

| 2,995,336 | 8/1961 | Usab ............................. | 251/315X |
| 3,033,227 | 5/1962 | Goldman ....................... | 251/171X |
| 3,096,965 | 7/1963 | Margus et al. ................. | 251/315X |
| 3,239,191 | 3/1966 | Widera .......................... | 251/315X |
| 3,245,655 | 4/1966 | Oetjens ......................... | 251/315 |

Primary Examiner—William R. Cline
Attorney—William E. Sherwood

ABSTRACT: A ball valve assembly including a pair of end connectors detachably held respectively against a tubular valve body and a seal carrier slidably mounted in one end of the valve body has a rotatable ball valve actuated by a handle detachably engaging a valve stem exteriorly of the body, the ball being held in contact with annular seals carried respectively by the carrier and the valve body; a pair of union nuts serves to join the connectors detachably to the valve body and to provide for a tightening adjustment of the parts of the assembly when wear occurs upon the seals.

PATENTED DEC 29 1970
3,550,902
INVENTORS
EDGAR J. PIDGEON
GUILLERMO J. VANEGAS
BY W. E. Sherwood
ATTORNEY
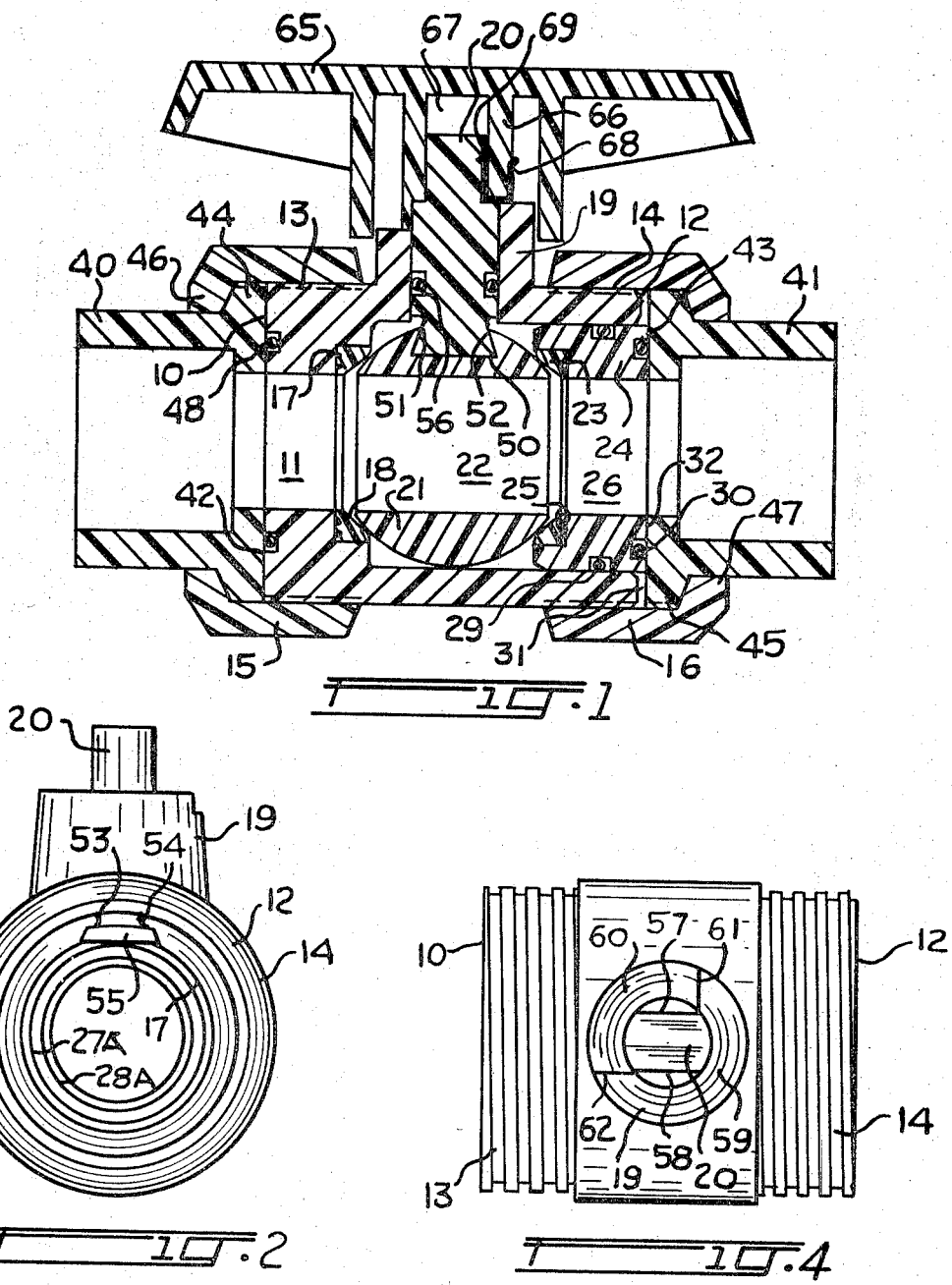

DOUBLE-UNION BALL VALVE ASSEMBLY

BACKGROUND OF THE INVENTION

The employment of various forms of unions in connection with valve bodies so that a valve may be removed from a piping system for repair or replacement is well known, and many forms of dropout type of valve body carrying the valve with it have been suggested. In some cases this has embodied a flange type of union such as disclosed in Scaramucci U.S. Pat. No. 3,380,707 and in others a threaded type of union fastening has been employed. In all cases, however, it is essential that no leakage occur when the assembled structure is in use, and it is desirable, that the pipe ends not be disturbed when the valve is removed from, or reinserted into the line.

Conventional assemblies with which we are familiar and which meet these requirements have generally required the use of a large number of parts, to achieve the sealing action and usually require special tools to enable the user to assemble or disassemble the structure. Frequently, such assemblies also involve parts which require machining in their manufacture and which are expensive. By contrast, the chief elements of the valve assembly of the present invention preferably comprise molded parts made of plastic materials, for example, polyvinylchloride, Penton, and the like and which are molded to close tolerances.

SUMMARY

The double-union ball valve assembly of the invention includes a tubular valve body within which a ball valve having a flow passage therethrough is detachably mounted. A tubular seal carrier is slidably mounted in one end of the valve body and carries an annular seal engaging with one side of the ball valve and the valve body itself carries another annular seal engaging with the ball valve on the diametrically opposite side of the same, whereby advancing movement of the carrier may compensate for wear in either or both of the annular seals. A pair of end connectors having end walls respectively abutting against the valve body and against the seal carrier and sealed with O-rings thereagainst are attachable to the ends of adjacent pipes with which the ball valve assembly cooperates. A pair of threaded union nuts engage with external threads on the ends of the valve body and with the end connectors. The ball valve includes a dovetail slot into which a correspondingly shaped key on the lower end of the valve stem is detachably engaged; the stem being mounted within a passage extending laterally of the valve body. A detachable handle having a snap-in clip engages the distal end of the valve stem and serves to turn the ball valve between its open and closed positions.

Among the objects of the invention are the provision of a reliably sealed ball valve assembly which can be readily inserted in or removed from a piping system without the employment of special tools; and improved double-union ball valve assembly having a simple seal carrier which can be adjusted to compensate for seal wear; an improved fastening means for detachably joining a valve stem to a ball valve; and an improved fastening means for detachably joining a ball valve stem to a handle for operating the valve.

These and other objects and advantages of the invention will become more apparent as the description proceeds and when considered in conjunction with the accompanying drawings in which:

FIG. 1 is a longitudinal sectional view of the valve assembly with the ball in fully open flow position;

FIG. 2 is an end view of the valve body with the valve stem in position and showing the lower end of the valve stem;

FIG. 3 is an elevation view of the inner end of the carrier with the annular seal removed therefrom; and FIG. 4 is a top plan view of the valve body with the handle removed and showing the projecting end of the valve stem.

Referring first to FIG. 1 a preferred embodiment of the invention includes a tubular valve body having a wall 10 at one end extending normally to the axis of a flow passage 11 through that wall and having an annular edge 12 at the opposite end of the body. The exterior surface of the body is threaded at 13, 14 adjacent its ends so as to engage with union nuts 15, 16 having a threaded portion on their inner surfaces. A recess 17 formed in the body surrounding and adjacent the flow passage 11 provides a first seal seat into which a conventional annular seal 18 is fitted. Extending laterally from a central portion of the body is a tubular housing 19 for a valve stem 20.

A valve ball 21 having a flow passage 22 therethrough is detachably engageable with the valve stem as later to be described, and is normally confined between seal 18 and a similar seal 23 mounted on a tubular seal carrier 24. As best seen in FIG. 3, the carrier 24 includes a recess 25 surrounding and adjacent its flow passage 26 on its inner end and is provided with a pair of concentric small sharp ribs 27, 28 on the back face of the recess. The material of the carrier is harder than the material of seal 23, which preferably is of Teflon, and these ribs serve to bite into the seal and to lock it in place during usage of the valve. Similarly, the inner face of the recess 17 of the valve body is provided with ribs 27A, 28A for effecting the same locking action upon seal 18. A circumferential groove on the periphery of the carrier contains an O-ring 29 of Viton or the like engageable with the inner surface of the valve body, and the outer end of the carrier wall 32, which is normal to flow passage 26, contains a circular groove in which an O-ring 30 is disposed. The length of the carrier between its seat for seal 23 and the outer end of its wall is such as to leave an adjusting space 31 outboard of annular edge 12 of the valve body when the parts are fully assembled.

A pair of end connectors 40, 41, which may contain sockets as shown, or may be interiorly threaded, serve as means for attaching pipes (not shown) to the valve assembly. These connectors have axial flow passages and inner end walls 42, 43, normal thereto and which end walls abut respectively against the body wall 10 and the end wall 32 of the carrier. In addition, the end connectors include peripheral flanges 44, 45 at their end walls and which flanges are suitable suitably shaped to be engaged by complementary flanges 46, 47 on the union nuts. A circular groove in the outer face of the valve body wall 10 contains an O-ring 48 which further assists in sealing of the assembly.

As will now appear, when the described parts are assembled for use, the valve ball is sealed by its contact with annular seals 18, 23 and the stationary seal 18 serves to locate the valve ball with respect to the centerline of the valve stem housing. The valve ball is formed at its top with a dovetail recess 50 extending completely across the ball and in a direction normal to the direction of the flow passage 22 in the ball, and the upper edges 51, 52 of the sidewalls of this recess are adapted to fit into complementary grooves 53, 54 in the lower portion of the valve stem. This stem, moreover, terminates at its lower end in a key 55 having a flat lower end and an arcuate upper surface corresponding generally to the upper surface of the ball at the point of their engagement, as noted in FIG. 2. A peripheral groove in the central region of the valve stem contains an O-ring 56 engageable with the housing 19. As noted from FIG. 4, the upper end of the stem includes parallel sidewalls 57, 58 with one of which a fastening clip now to be described, is adapted to cooperate. The upper end of the housing terminates in stepped planes with the upper plane 59 extending through 270° and the lower plane 60 extending through 90° thus to form stops 61, 62 against which a handle may abut when moving the valve into fully opened or fully closed positions.

Referring now to FIG. 1, a handle 65 includes a downwardly extending integral web 66 having a recess 67 therein for receiving the upper end of valve stem 20. One wall portion of this web is flat and is covered with a U-shaped metallic clip having an outer leg 68 resiliently engaging one side of the web and an inner leg 69 resiliently engaging the other side of the web and adapted to provide a tight, detachable fastening with one sidewall, for example 57, of the valve stem when the handle is pushed downwardly. In order to enhance the gripping action, barbs may be located in the inner leg to bite into the material of the valve stem. A shoulder (not shown) may be formed integrally with the web to engage with the stops 61, 62 when the assembled handle and valve stem are rotated the proper distances.

Accordingly, when it is desired to disassemble the structure shown in FIG. 1 for inspection, the following procedure may be followed after interrupting flow through the piping attached thereto. Using a strong pull with the hand the handle 65 is raised to disengage the clip from the valve stem; the two union nuts are rotated to disengage them from the valve body and to dispose the nuts over the piping connected to the end connectors; the valve body carrying the ball, stem and seal carrier therewith is dropped out of the piping line without disturbing the pipes; the carrier is removed endwise from the valve body; the ball is next removed by sliding endwise of the dovetail recess; and the valve stem is pushed downwardly into the valve body and removed therefrom. Repair or replacement of seals may then be made and the structure reassembled in a reverse order of the described steps. As will be seen, no special tools are required. Various other advantages of the invention will be appreciated by those familiar with conventional ball valve assemblies. For example, when turned into its closed position during use, the ball can by reason of its slotted stem connection adjust itself toward the upstream annular seal; by reason of the engagement of the edges of the ball in the grooves 53, 54 of the valve stem a more effective turning of the ball by the stem and its attached handle is assured; by reason of the clip a simple snap-on handle is may be used and without employing conventional pinning of the handle to the stem.

In view of the above disclosure it will be noted that the several objectives of the invention are achieved and other advantageous results obtained.

We claim:
1. A double-union ball valve assembly comprising a tubular valve body terminating at one end with an annular edge and at the other end with a wall normal to the axis of said body, said body being circumferentially threaded at each end and having an axial flow passage through said end wall and a lateral valve stem passage through the side of said body, a first seal seat surrounding and adjacent the flow passage on the inner side of said end wall, an axially movable tubular seal carrier having an axial flow passage and with an outer wall normal to its flow passage and of a diameter less than the inner diameter of the annular edge of said body, said carrier having a second seal seat surrounding and adjacent its flow passage on the inner end of said carrier, first and second tubular end connectors having inner end walls normal to said flow passages and adapted to abut respectively against the end wall of said body and the outer wall of said carrier, the axial length of said carrier between its seal seat and its outer wall being such as to provide an adjusting space between the annular edge of said body and the inner end of said second connector, a valve ball having a flow passage therethrough, a stem detachably connected to said ball, a handle detachably connected to said stem exteriorly of said body, a pair of annular seals removably positioned on said seals in contact with said ball, and interiorly threaded union nuts engaging said valve body and bearing upon said end connectors for detachably holding said connectors against the respective end walls of said body and the outer wall of said carrier thereby to engage the valve ball against said seals, said seal carrier being limited in its axial movement toward said valve ball solely by the contact of the seal carried thereby against said valve ball.

2. An assembly as defined in claim 1 wherein the connection between said handle and said stem comprises a clip mounted upon said handle and frictionally holding said handle and the outer end of said stem together.

UNITED STATES PATENT OFFICE
CERTIFICATE OF CORRECTION

Patent No. 3,550,902  Dated December 29, 1970

Inventor(s) PIDGEON, Edgar J. and VANEGAS, Guillermo J.

It is certified that error appears in the above-identified patent and that said Letters Patent are hereby corrected as shown below:

Column 4, line 24, change "seals" to --seats--;

Column 4, line 27, change "walls" to --wall--.

Signed and Sealed this

Twentieth Day of July 1976

[SEAL]

Attest:

RUTH C. MASON
Attesting Officer

C. MARSHALL DANN
Commissioner of Patents and Trademarks